(12) United States Patent
Gulledge et al.

(10) Patent No.: US 7,991,874 B2
(45) Date of Patent: Aug. 2, 2011

(54) METHOD AND SYSTEM FOR BUSINESS ACTIVITY MONITORING

(75) Inventors: Robert William Gulledge, Saint Charles, MO (US); Brian O'Neal Bearden, Webster Groves, MO (US); Gary Lee Dunn, Streamwood, IL (US); Michael Khalili, Aurora, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1282 days.

(21) Appl. No.: 11/081,819

(22) Filed: Mar. 16, 2005

(65) Prior Publication Data
US 2006/0212567 A1 Sep. 21, 2006

(51) Int. Cl.
*G06F 15/173* (2006.01)

(52) U.S. Cl. .......... 709/224; 705/51; 709/201; 709/203; 709/207; 713/158

(58) Field of Classification Search .................. 709/224, 709/201, 203, 207; 705/51; 713/158
See application file for complete search history.

(56) References Cited

U.S. PATENT DOCUMENTS

| | | | |
|---|---|---|---|
| 6,317,788 B1 * | 11/2001 | Richardson .................... 709/224 |
| 6,327,352 B1 * | 12/2001 | Betts et al. .................... 379/189 |
| 6,370,508 B2 * | 4/2002 | Beck et al. .................... 705/1 |
| 7,231,442 B2 * | 6/2007 | Chen .......................... 709/224 |
| 7,343,294 B1 * | 3/2008 | Sandholm et al. .............. 705/10 |
| 7,389,342 B2 * | 6/2008 | Sundar et al. ................. 709/224 |
| 7,401,141 B2 * | 7/2008 | Carusi et al. ................. 709/224 |
| 2003/0193519 A1 * | 10/2003 | Hayes et al. ................. 345/721 |
| 2004/0064691 A1 * | 4/2004 | Lu et al. ....................... 713/158 |
| 2004/0218731 A1 * | 11/2004 | Karimi-Cherkandi et al. ......................... 379/32.01 |
| 2004/0230530 A1 * | 11/2004 | Searl et al. ..................... 705/51 |
| 2004/0249931 A1 * | 12/2004 | Garg et al. .................... 709/224 |

* cited by examiner

*Primary Examiner* — Yves Dalencourt
*Assistant Examiner* — Michael C Lai
(74) *Attorney, Agent, or Firm* — Toler Law Group

(57) ABSTRACT

The disclosure is directed to an enterprise system including a message topic, a monitor definition, a monitoring manager, and an alert topic. The message topic includes a message associated with performance of a distributed computing application. The monitor definition includes performance rules for evaluating data associated with the message associated with the distributed computing application. The monitor definition is associated with a role. The monitoring manager is configured to access the message topic. The alert topic is configured to receive an alert message from the monitoring manager. The monitoring manager provides the alert message in accordance with the monitor definition. The alert message is accessible to a user associated with the role.

28 Claims, 4 Drawing Sheets

METHOD AND SYSTEM FOR BUSINESS ACTIVITY MONITORING

FIELD OF THE DISCLOSURE

This disclosure in general relates to methods and systems for business activity monitoring.

BACKGROUND

Increasingly businesses are integrating computer resources into enterprise environments. In such enterprise environments, databases, legacy systems and other business applications are integrated to provide business functionality to the enterprise as a whole. Industries, such as the telecommunication industry, are supporting enterprise environments to connect databases, ordering systems, billing systems and service systems. However, large enterprise systems are difficult to monitor for business activity and use of enterprise resources is difficult to mange in large enterprise environments.

Business activities typically involve performing many transactions within the enterprise environment that may access several applications. In some large enterprise environments, a single transaction may result in the execution of hundreds of applications within the enterprise environment. An error in any one of these applications may consume excess computing resources, resulting in a reduced performance of the enterprise system. Moreover, misallocation of computing resources to applications that are accessed frequently may result in poor performance of the enterprise system as a whole.

In addition, a business unit may desire access to information associated with business activity. In particular, the telecommunications industry is under regulatory pressure to provide access to its computing resources by competitive local exchange carriers (CLEC), as well to provide detailed performance data regarding performance of business activities within the enterprise environment. Often independent local exchange carriers rely on databases and legacy systems within the enterprise environment to establish and maintain telecommunications service for their customers and the customers of the CLECs. These databases and legacy systems may be difficult to integrate into more recently developed enterprise systems. As such, providing access to these legacy systems as well as providing detailed data associated with business transactions that access these legacy systems is difficult. Therefore, improved methods and systems for business activity monitoring in enterprise environments would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS(S)

Figure 1:
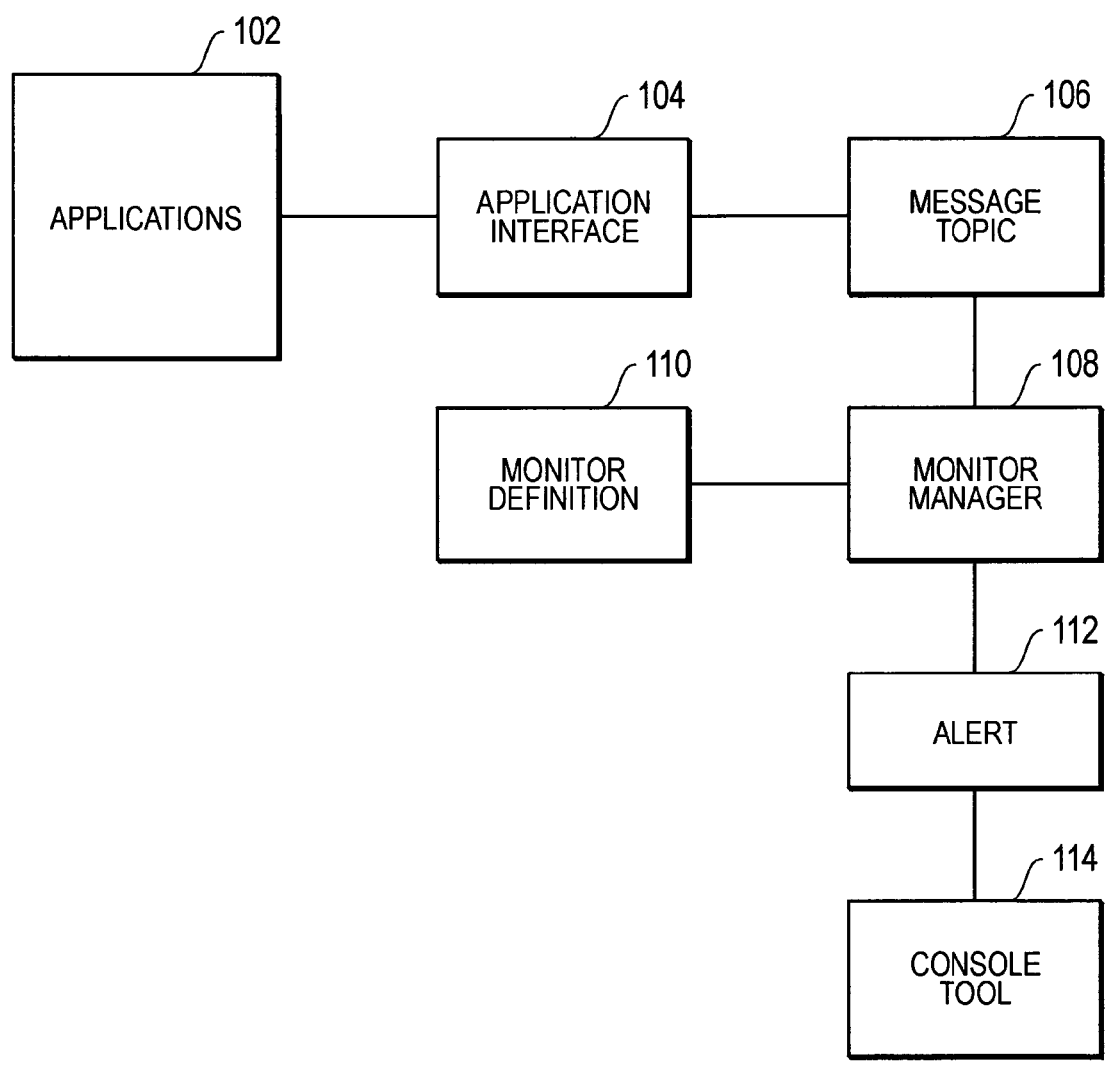
FIGS. 1 and 2 include illustrations of exemplary business activity monitoring systems.

In one particular embodiment, the disclosure is directed to an enterprise system. The enterprise system includes a message topic that includes messages associated with performance of distributed computed applications. The enterprise system also includes a monitoring manager configured to access the message topic and to evaluate the messages in accordance with a monitored definition. The monitored definition includes performance rules to evaluate data associated with the messages and is associated with a role. The enterprise system also includes an alert topic configured to receive alert messages from the monitoring manager. The monitoring manager provides the alert message in accordance with the monitored definition. The alert message is accessible to a user associated with the role. The user may for example access the alert message using a console tool. In addition, the enterprise system may include an administration tool configured to establish monitor definitions, roles, and users. The administration tool may associate a role with a monitor definition and with a user.

The disclosure is further directed to a method for monitoring business activity; the method includes establishing a monitor definition that is associated with a role, establishing a user, associating the user with the role, and accessing alert messages provided in accordance with the monitor definition and the role. In addition, the disclosure is directed to a method for monitoring business activity that includes receiving messages at a message topic, evaluating the messages, in accordance with a monitor definition and providing an alert message to a user associated with a role that is associated with the monitor definition.

In one particular embodiment, the disclosure is directed to an enterprise system including a message topic, a monitor definition, a monitoring manager, and an alert topic. The message topic includes a message associated with performance of a distributed computing application. The monitor definition includes performance rules for evaluating data associated with the message associated with the distributed computing application. The monitor definition is associated with a role. The monitoring manager is configured to access the message topic. The alert topic is configured to receive an alert message from the monitoring manager. The monitoring manager provides the alert message in accordance with the monitor definition. The alert message is accessible to a user associated with the role.

In another embodiment, the disclosure is directed to a method of managing an enterprise environment. The method includes providing a monitor definition associated with a role. The monitor definition includes rules associated with processing a message associated with performance of a distributed computing application. The method further includes associating a user with the role, and accessing an alert message provided in accordance with the monitor definition.

In a further embodiment, the disclosure is directed to a method of managing an enterprise environment including providing a monitor definition associated with a role. The monitor definition includes rules associated with processing a message associated with performance of a distributed computing application. The method further includes processing the message in accordance with the rules to provide an alert message associated with the role and providing the alert message to a user associated with the role.

In one exemplary embodiment, FIG. 1 illustrates an exemplary business activity monitoring system. Applications 102 such as databases, job applications, programs, and legacy systems provide messages via an application interface 104 to a message topic 106. In one embodiment, the messages include information regarding which application was run and at what time the application was run. The messages may further include unique identifiers and global transaction identifiers to help track transactions through the enterprise environment. In addition, the messages may include details about the application with which they are associated, details about the performance of that application, status of the application, data associated with the application and data associated with errors experienced by the application.

The monitor manager 108 may access the message topic 106 to evaluate messages in accordance with monitor definitions 110. In one exemplary embodiment, the monitor definitions are configured to track transaction time limits associated with government mandates in a telecommunications enterprise environment. In another example, the monitor definitions are configured to inspect specific events within a business process and evaluate conditions relative to those events. The monitor definition may for example, evaluate the elapsed time between two or more events, the value of the event, the occurrence of a specific event, the frequency with which an application is accessed, error events associated with an application, and the ratio of events having one condition versus another condition. In more complex cases, the monitor definition may evaluate the occurrence of several events in a specific order or the absence of an event within a particular transaction.

Evaluation of messages and events associated with those messages may result in the generation of a status message or alert message in accordance with the monitor definition 110. Generally, the monitor definition is established to monitor business activities associated with a specific business unit and accessible to a user having a specific role within that business unit. In particular, the alert message and status message may be accessible by a user associated with a particular role also associated with the monitor definition generating the alert message or status message. For example, the monitor manager 108 may provide an alert message to an alert topic 112, accessible by a user through a console tool 114. In a particular embodiment, the alert message is associated with a role and users associated with the role may access the alert message.

Figure 2:
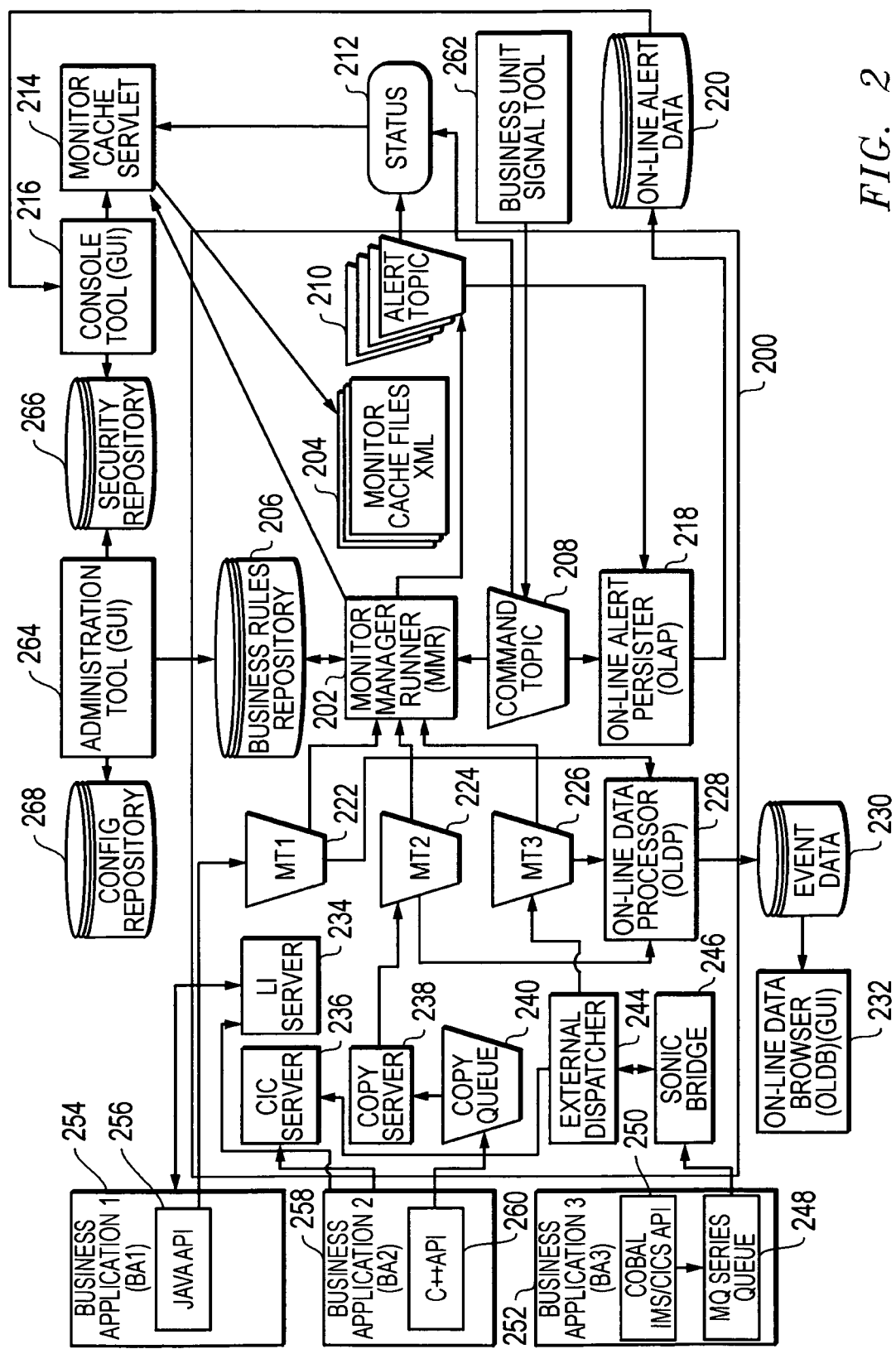

FIG. 2 includes an illustration of exemplary enterprise architecture for monitoring business activity. Business applications, such as business applications 254, 258 and 252, provide messages to a business activity monitoring service 200. In one particular embodiment, the business activity monitoring service 200 is implemented as a Java application environment. The business applications (e.g. 254, 258, and 252) generally run in application environments specific to the language in which the application is coded and the functionality provided by the application. For example, a business application, such as business application 254, may be a Java application running in a Java application environment. In another example, a business application, such as business application 258 may run be programmed in C++ and run in an application environment conducive for running compiled programs. In a further example, a business application, such as business application 252 may be coded in common business oriented language (COBOL) information management systems (IMS) or customer information control system (CICS). Typically, an enterprise system will include several servers and systems running several different environments and many different applications.

The business applications (e.g. 254, 258 and 252) may interface with the business activity monitoring system 200 through application interfaces 256, 260 and 250. For example, in the case of java applications, a business application 254 may access a java application interface 256, which provides messages to a message topic 222. The application interface 256 may also access a logger identity (LI) service 234 to acquire a unique transaction ID that aids in tracking transactions across the enterprise system. Generally, the LI service 234 receives ID requests from an application interface and provides a unique transaction identification that can be used to trace a specific transaction through multiple applications and across the enterprise environment. In another example, C++ based applications 258 may access the business activity monitoring service 200 through a C++ application interface 260. The application interface 260 may provide messages to a copy queue 240. The copy queue 240 is for example, a Java message service (JMS) queue for delivering messages from the C++ application interface 260. The copy queue 240 provides the messages to a copy server 238, which provides a service to read messages from one JMS queue, to a message topic at 224. The application interface 260 may also access a component identity catalog server 236, which matches the identities of components of the enterprise environment by mapping common names of those components to actual component identities. Common names are typically strings that must be unique across the enterprise. In addition, the C++ application interface 260 may access the LI service 234 to acquire unique transaction IDs.

In a further example, business applications based on COBOL IMS and CISC may access the business application monitoring service 200 through an application interface 250. The application interface 250 provides messages through a MQ series queue 248.

For example, the MQ series queue 248 may be a mainframe MQ series queue to which the CICS and IMS COBOL application interface 250 publishes messages. A sonic bridge 246 associated with the business application monitoring service 200 pulls the messages from the MQ series queue 248. An external dispatcher 244 is a message handling component that reads events from the sonic bridge queue 246 and publishes the messages to a message topic 226. In addition, the external dispatcher 244 accesses the component identity catalog server 236 to map the common names of the components to the actual component identities.

In one particular embodiment, the message topics or event topics 222, 224, and 226 include topic limits. Once the topics 222, 224, and 226 are full, a pause command may be sent to the associated servers, dispatchers and application interfaces to limit or drop message traffic.

Messages stored in the message topics or event topics 222, 224 and 226 may be persisted by accessing an online data processor 228, which takes the messages from, for example, a JMS topic (e.g. 222, 224, and 226) and moves them to an event database 230. In one exemplary embodiment, all messages and events from the message topics 222, 224 and 226 may be stored in the event database 230 for a period of time, such as for example thirty days.

The message topic or event topic data may be accessed by an online data browser 232. In one particular embodiment, the online data browser 232 includes a graphical user interface. The graphical user interface may provide a user with access to detailed data associated with individual messages. In addition, the graphical user interface may allow a user to filter or search through a large set of messages or specific messages and view the detailed data associated with those specific messages individually.

A monitor manager runner 202 also accesses the event topics 222, 224 and 226 and processes messages in accordance with business rules and monitors. In one exemplary embodiment, the business rules are stored in a repository 206, which is a warehouse for rules containing monitor definitions and policies for business transaction processing. In one particular embodiment, these rules set the criteria for data mapping. Monitor definitions may also be stored as cache files 204, such as, for example in an extensible markup language (XML) format. In one exemplary format, the monitor manager runner 202 provides data associated with the monitor definitions to a monitor cache servlet 214, which stores the monitor definitions, and cache files 204.

The monitor manager runner 202 accesses the messages in event topics 222, 224 and 226 to process them in accordance with the monitor. The monitor includes a set of rules implemented in event handling scripts that intercept and process message events. In one particular embodiment, the monitors include a measurement that has a value. The measurement is typically defined based on a metric. The metric is a shorthand description of the meaning of the measurements associated with the monitor subject. Generally, the metric will appear with any alert produced by a specific monitor. The value of the measurement associated with the metric, is determined by the scripts associated with the monitor definition. In one exemplary embodiment, the scripts are formed using a simple edit engine technology (SEE) the monitor definition may also provide for constants which bind literal values to variables used by the SEE scripts or rules. Measurement examples include an absolute number of failed transactions over a time period, the ratio of total transactions within some classification, and the interval measurements (i.e. the time between two transaction states). The monitor may, for example, include an upper threshold or a lower threshold. With an upper threshold, when the monitor's measurement meets or exceeds a given value, the monitor enters a given state. With a lower threshold, the monitor enters a given state when the measurement is below the threshold value. In other examples, the monitor enters a particular state based on the text of a message, based on a ratio of message having one state versus another state, based on the average time between messages from a specific application, or based on the time or resources consumed by a specific application. Generally, when the monitor enters a particular state, an alert message or status message is generated.

Each monitor is associated with a business model. A business activity model is a component that groups together monitors and proto-types that uniquely identify a business unit. In one particular embodiment, the monitor is stored in a business model file, such as an XML file. The business model file may include prototype elements, filter elements, script elements, and monitor elements. The prototype elements may be used as the basis for any number of monitor definitions and describes an abstract and named definition for monitor structure or behavior. The filter elements define filters that discriminate message properties and transaction properties to select or identify particular messages or events. The script elements provide scripts for processing messages. The monitor element describes the monitor definition implemented as the monitor and may reference the prototype, filter and script elements. Monitors may inherit definitions from prototypes. Predefined prototypes provide attributes, behaviors or defaults that are inherited by the monitor. The monitor inherits characteristics associated with the specific prototype, such as filters and constants. In one embodiment, a prototype business model may be provided from which other business models and elements within those business models may inherit structure and behavior.

In one particular embodiment, the monitor is provided with a name that is unique within the business model. A monitor description field may also be provided to aid in the identification of a specific model. The monitor is further associated with a role. The roles determine who will have access to the data generated by the monitor. Permissions are based on the role based access control, which limits access to messages and data produced by the monitor to users associated with the role.

The monitor may be associated with components, such as other monitors or applications that provide messages to the event topics 222, 224 and 226. Messages from the topics associated with specific components may be processed in accordance with the SEE rules to produce status messages and alert messages. In addition to the components, the monitor may be associated with an external component, such as a Vantive component, which allows the monitor to communicate with external systems, for example, to provide email notifications to users.

In large enterprise systems, a large number of messages may be received by any one event topic. The monitor may be associated with a filter, such as a filter defined by the business model filter element, which identifies a sub-set of messages to which the monitor may be applied. In addition, the monitor may include an event queue limit, which tells the monitor to drop new events once its internal queue reaches a particular depth. The number of consecutive events that have been dropped based on the event queue limit may be long.

Based on the monitor's definition, the monitor manager runner 202 processes messages and produces alert messages that may be stored in an alert topic 210. In one exemplary embodiment, the alert topic 210 is a JMS topic for delivering alert messages from the monitor manager runner 202 to console web applications and an online alert persister 218. The online alert data persister 208 may persist alert data for a period of time, such as two days in an online alert database 220. In one particular embodiment, the online alert data persister 208 may include a holiday configuration file that instructs the persister 208 to persist data over holiday periods or include data extends backwards two business days. The monitor manager runner 202 may also process command topic messages 208, which deliver command messages from other business activity monitoring system components to the monitor manager runner 202.

In one particular embodiment, a user may access the business activity monitor service 200 through a console tool 216. The console tool 216 may for example be a web based access tool or graphical user interface. A user may access the console tool 216 and provide the user name and password or other authentication methods to the console tool 216. The user may be authenticated using security repository 266. Once the user's identity has been established, the user's role may permit access to one or more of the alert topics 210 through status messages 212 or through an online alert database 220 connected to the online alert persister 218. Generally, a user is limited to viewing those messages associated with a monitor definition associated with a role to which the user has been identified. The console tool 216, in one exemplary embodiment, provides access to a listing of alert topics in chronological order. In alternative embodiments, the console tool may provide filter and search features to enable a user to find and view alert messages in an otherwise orderly fashion. In addition, the console tool 216 allows a user to view details about a specific alert message.

Using these alert messages, a user may for example identify problems within the enterprise associated with the specific business activities for which the user has responsibility. In a regulatory position, the user may be provided with data associated with regulatory mandates. In a resource management position, the user may be provided with data that identifies more effectively uses of enterprise resources or identifies problems with applications within the enterprise environment.

An administration tool 264 may be provided to enable entry of business models, identify users, establish roles, create monitor definitions, and generally configure the business activity monitoring service 200 for the specific purposes of a given business unit. In one particular embodiment, the administration tool 264 enables the registry of components within the enterprise. Registering the components provides a unique identification for individual components and messages entering into the system that are associated with those components. For example, a component registry may be stored with CIC server 236.

The administration tool 264 may also be used to establish roles for users and to associate with monitor definitions. Within a business model, roles aid in defining to which messages associated with components and monitor definitions a user will have access. Using the administration tool 264, a user may be defined and associated with a role. For example, the user may be provided with a user name and password, which are stored in the security repository 266. The security repository 266 stores permission data, which determines which users or roles can access specific system resources.

The administration tool 264 may also be used to established the monitor definitions, associate the monitor definitions with roles and components, and provide the monitor definitions with appropriate scripts. The monitor definitions may then be placed in the business rules repository 206 along with other roles that are managed by the monitor manager runner 202. The business rules repository 206 is a warehouse for rules containing definitions for business transaction processing. Additional configuration data may be stored in the configuration repository 268. In one particular embodiment, the configuration repository 268 is an XML administration repository having a specified directory structure that organizes XML documents in a logical manner.

In one particular embodiment, the business activity monitoring service 200 is implemented in a JAVA environment. Message and event topics may use JMS technology and functions of the business activity monitoring service 200 may be provided by Java applications. In alternative embodiments, the business activity monitoring service 200 may be implemented in NET or other computational environments.

Figure 3:
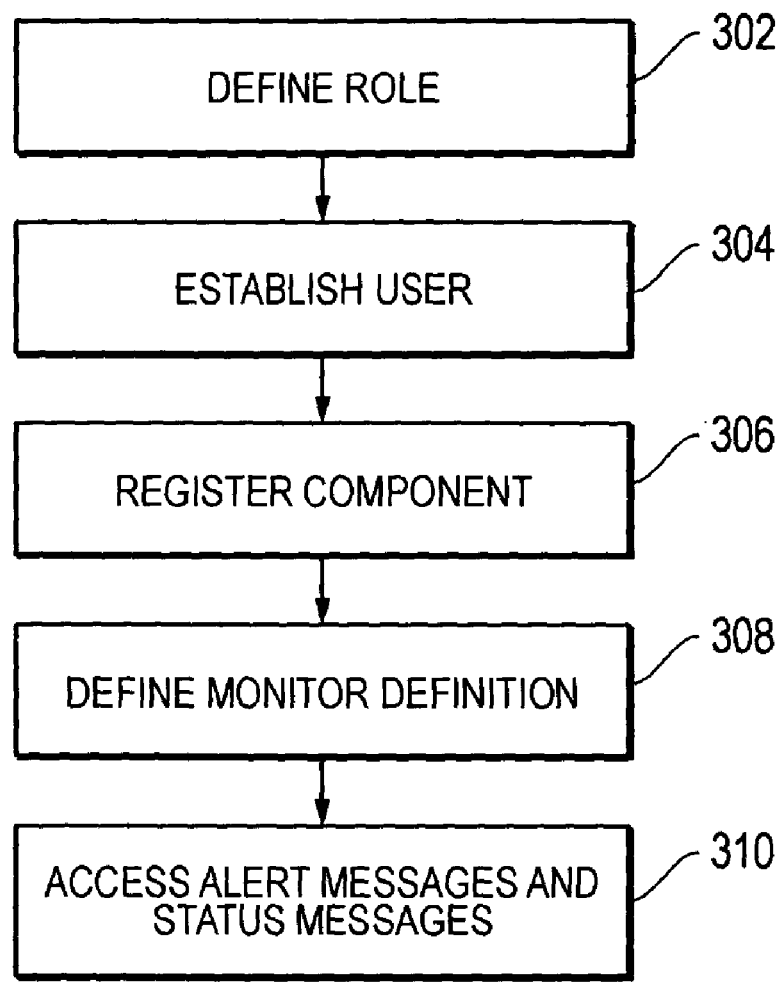
FIGS. 3 and 4 include illustrations of exemplary methods for use in conjunction with business activity monitoring systems and enterprise environments, such as the business activity monitoring systems illustrated in FIGS. 1 and 2.

FIG. 3 illustrates an exemplary method for administrating in a business activity monitoring environment. An administrator may define a role within a business model, as illustrated at 302. When associated with a role, the user may have access to alert messages and topics generated by a monitor that is associated with the role.

The administrator may also establish a user, as illustrated at 304. Establishing a user includes providing a user name, a password or other security measure, and associating the user with a role.

The administrator may also register components, such as applications and monitor prototypes, as illustrated at 306. Registering the component provides a unique identifier or identity of the component within the enterprise environment. Typically, messages associated with registered components are identified via data provided by the CIC server 236.

The administrator may also define a monitor, as illustrated at 308. The monitor definition includes, event handling scripts that determine a monitor's value, and to which thresholds and other logic are applied. In addition, defining a monitor definition includes providing the monitor with a description and a unique name within a business model. The monitor is also associated with a role. Alert messages generated by the monitor may be viewed by users associated with that role.

Users associated with a specific role as defined by the administrator may access alert messages and status messages generated by a monitor manager runner based on or in accordance with the monitor's definition, as illustrated at 310. For example, users may access a console tool, such as web-based application, to review messages associated with a specific role.

Figure 4:
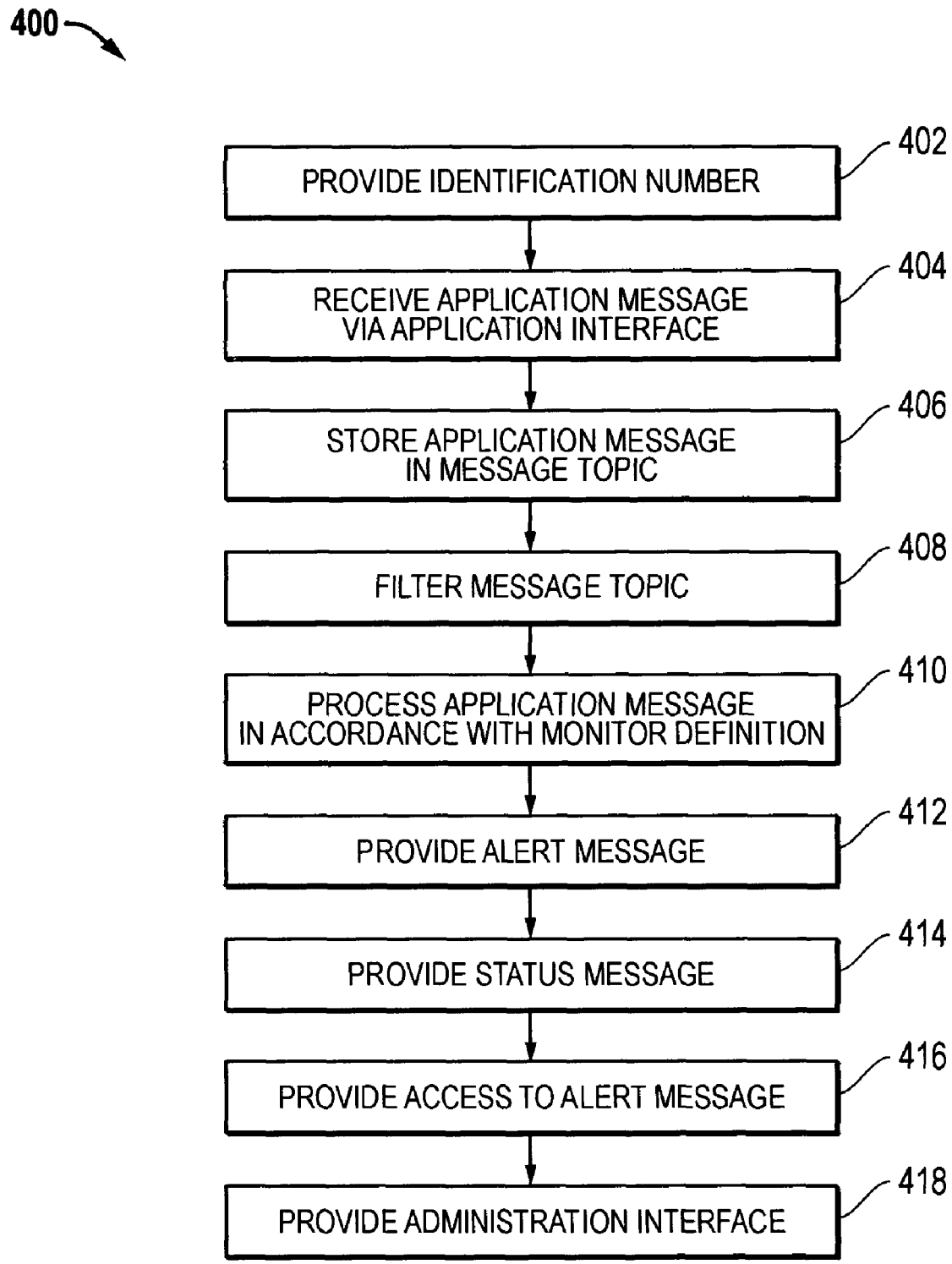

From the perspective of the business application monitoring service, a method 400 is provided, as illustrated in FIG. 4. The method includes providing an identification number to a business application, as illustrated at 402. For example, a unique transaction ID may be provided to applications through an application interface, such as Java application interface 256 or C++ application interface 260. The transaction ID may provide the system with an added method of tracking transactions across the enterprise environment. Through the application interfaces, the business application monitoring service 200 receives application messages, as illustrated at 404. These messages are store in message or event topics, as illustrated at 406.

The message or event topics may be filtered, as illustrated at 408, in accordance with filters associated with monitored definitions. The filters act to identify sub-sets of messages to which the monitors are to be applied. The filtered messages may be processed in accordance with the monitors' definitions, as illustrated at 410. For example a monitor manager runner may process the messages in accordance with the monitor definitions and provide alert messages based on the logic provided within the monitor definition, as illustrated at 412. In addition, the monitor manager runner may provide status messages, as illustrated at 414.

Access to alert messages may be provided to users, as illustrated at 416. For example, alert messages generated in accordance with a monitor definition have an associated role. A user associated with that role may access the alert message through, for example, a console tool. In one particular embodiment, the console tool is a web-based interface that provides access to users to detailed and summary information associated with alerts.

The business activity monitoring service 200 may further provide an administration interface, as illustrated at 418. The administration interface for example may be a web-based graphical user interface that provides administrators with the ability to register components, establish roles, establish users associated with roles, and provide monitor definitions to be associated with roles.

In particular embodiments described above, portions of an enterprise environment may be selectively monitored by business units and users within those business units. In particular for the telecommunications industry, access may be applied to a limited and specific set of business activity monitoring functionality for regulatory compliance monitoring.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An enterprise system comprising:
   at least one server implemented in hardware and running at least one distributed computing application;
   a message topic configured to receive at least one message associated with performance of the at least one distributed computing application during a transaction, the at least one message identifying a duration of time that the at least one distributed computing application is executed, the at least one message including at least one unique identifier and at least one global transaction identifier to track the transaction through a telecommunications enterprise environment;

a monitor definition including performance rules for monitoring performance events of the at least one distributed computing application, the monitor definition configured to track transaction time limits associated with government mandates in the telecommunications enterprise environment and configured to define a role for at least one user, wherein the role defines whether the at least one user can receive and access alert messages, wherein the monitor definition receives a script from an administration tool and is stored in a business rules repository along with the role, wherein the business rules repository also stores data mapping criteria that maps common names of enterprise components to component identities;

a monitoring manager configured to access the message topic and to evaluate data of the at least one message using the performance rules to transmit an alert message, wherein the performance rules include at least one rule based on a ratio of messages having a first state to messages having a second state; and an alert topic configured to receive the alert message from the monitoring manager, the alert message accessible to the at least one user associated with the role.

2. The enterprise system of claim 1, further comprising a console tool, the console tool configured to display a graphical user interface to the at least one user to access the alert message, wherein the graphical user interface comprises data associated with the alert message.

3. The enterprise system of claim 1, wherein the administration tool is configured to create the monitor definition, to associate the at least one user with the role, and to define the role.

4. The enterprise system of claim 3, wherein the role is associated with a business unit.

5. The enterprise system of claim 1, further comprising an application interface configured to receive the at least one message from the at least one distributed computing application and to associate the at least one message with the message topic.

6. The enterprise system of claim 1, further comprising an event database configured to access the message topic and store the at least one message and an access tool configured to access the event database.

7. The enterprise system of claim 1, wherein the monitor definition is implemented in extensible markup language (XML) or as a JAVA Application.

8. The enterprise system of claim 1, wherein the monitor definition is associated with a filter configured to identify a subset of messages of a plurality of messages stored in the message topic.

9. The enterprise system of claim 1, wherein the monitor definition is associated with a second monitor definition or distributed computing application.

10. The enterprise system of claim 1, wherein the script includes one or more variables bound to one or more literal values.

11. The enterprise system of claim 1, further comprising a notification component configured to transmit an electronic mail (e-mail) notification of the alert message.

12. The enterprise system of claim 1, further comprising a data persistence module configured to persist data during a holiday period, to persist data over a number of business days, or any combination thereof.

13. The enterprise system of claim 1, wherein the monitor definition is configured based on a purpose of a particular enterprise business unit.

14. A method of managing an enterprise environment including at least one server implemented in hardware and running at least one distributed computing application, the method comprising:

storing a monitor definition at a computing device, the monitor definition configured to define a role for at least one user, the role associated with whether the at least one user can receive and access alert messages, and the role including performance rules associated with processing a message of a message topic associated with performance of the at least one distributed computing application, the monitor definition further configured to track transaction time limits associated with government mandates in a telecommunications enterprise environment;

associating a user with the role;

receiving at least one message associated with performance of the at least one distributed computing application during a transaction, the at least one message identifying a duration of time that the at least one distributed computing application is executed, the at least one message including at least one unique identifier and at least one global transaction identifier to track the transaction through the telecommunications enterprise environment; and accessing an alert message generated in accordance with the monitor definition;

wherein the monitor definition is configured to receive a script from an administration tool;

wherein the monitor definition is stored in a business rules repository along with the role, wherein the script includes one or more variables bound to one or more literal values, wherein the business rules repository also stores data mapping criteria that maps common names of enterprise components to component identities, wherein the performance rules include at least one rule based on a ratio of messages having a first state to messages having a second state.

15. The method of claim 14, further comprising defining a filter configured to identify the message from a plurality of messages in the message topic.

16. The method of claim 14, further comprising associating the filter with the monitor definition.

17. The method of claim 14, further comprising defining the role with a business model.

18. The method of claim 14, further comprising registering a component.

19. The method of claim 18, wherein the component is the at least one distributed computing application.

20. The method of claim 18, further comprising associating the component with the role.

21. A method of managing a telecommunications enterprise environment including at least one server implemented in hardware and running at least one distributed computing application, the method comprising:

storing a monitor definition in a business rules repository, the monitor definition configured to:

define a role for at least one user, the role defining whether the at least one user can access alert messages, the role including performance rules associated with processing a message of a message topic associated with performance of the at least one distributed computing application, and the role stored in the business rules repository, the message identifying a duration of time that the at least one distributed computing application is executed, the message including at least one unique identifier and at least one global transaction identifier to track a transaction through the telecommunications enterprise environment; and track transaction time limits associated with government mandates in the telecommunications enterprise environment;

processing the message in accordance with the performance rules to generate an alert message associated with the role, wherein the performance rules include at least one rule based on a ratio of messages having a first state to massages having a second state; and providing access to the alert message to the at least one user associated with the role.

22. The method of claim 21, further comprising receiving the message via an application interface.

23. The method of claim 22, wherein the application interface is accessible to JAVA applications.

24. The method of claim 22, wherein the application interface is accessible to applications programmed in C++.

25. The method of claim 22, wherein the application interface is accessible to applications programmed in COBOL/IMS or CICS.

26. The method of claim 22, further comprising storing the message in the message topic, the message topic accessed to process the message.

27. The method of claim 26, further comprising filtering the message topic in accordance with a filter associated with the monitor definition to identify the message.

28. The method of claim 21, further comprising displaying an administration tool interface to define the monitor definition.

\* \* \* \* \*